(12) United States Patent
Kim

(10) Patent No.: US 11,005,341 B2
(45) Date of Patent: May 11, 2021

(54) SEALING STRUCTURE FOR PERIPHERAL AREA OF GENERATOR FAN

(71) Applicant: DOOSAN HEAVY INDUSTRIES & CONSTRUCTION CO., LTD., Changwon-si (KR)

(72) Inventor: Sung Ha Kim, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 77 days.

(21) Appl. No.: 16/412,665

(22) Filed: May 15, 2019

(65) Prior Publication Data

US 2020/0014281 A1   Jan. 9, 2020

(30) Foreign Application Priority Data

Jul. 4, 2018   (KR) .................... 10-2018-0077467

(51) Int. Cl.
*H02K 9/10* (2006.01)
*F04D 29/08* (2006.01)

(52) U.S. Cl.
CPC ............. *H02K 9/10* (2013.01); *F04D 29/083* (2013.01); *F05D 2240/55* (2013.01)

(58) Field of Classification Search
CPC ......... H02K 9/10; F04D 29/08; F04D 29/083; F04D 29/10; F04D 29/12; F04D 29/122
USPC ........................................ 310/58, 59, 62, 53
See application file for complete search history.

(56) References Cited

U.S. PATENT DOCUMENTS

| 4,051,400 | A |   | 9/1977 | Armor et al. |
| 4,208,599 | A | * | 6/1980 | Armor ............... H02K 9/10 310/53 |
| 6,346,753 | B1 | * | 2/2002 | Jarczynski ......... H02K 9/10 310/53 |

(Continued)

FOREIGN PATENT DOCUMENTS

| JP | 06-343243 A | 12/1994 |
| JP | 2011196356 A | 10/2011 |

(Continued)

*Primary Examiner* — Burton S Mullins
(74) *Attorney, Agent, or Firm* — Invenstone Patent, LLC

(57) ABSTRACT

Provided is a sealing structure for sealing a peripheral area of a fan of a generator. The sealing structure includes a rotor, a fan assembly including a ring-shaped fan body coupled to an axial end of the rotor, multiple fan blades radially arranged along a circumferential surface of the fan body, and an annulus groove recessed, in an axial direction of the rotor, from an axial outer end surface of the fan body, a stator surrounding the rotor with an air gap provided between the stator and the rotor, a cooler positioned a predetermined distance apart from the stator, and a cooling gas duct including an outlet connected with the cooler and an inlet configured to cover the axial outer end surface of the fan body and an axial end of the air gap between the stator and the rotor, wherein an inlet-side end of the cooling gas duct includes a first member and a second member that are coaxially arranged and are positioned close to the axial outer end surface of the fan body and the axial end of the air gap, respectively, and an inlet-side end of the first member is inserted into the groove with a clearance, and a sealing device is provided on the inlet-side end of the first member.

18 Claims, 6 Drawing Sheets

(56) References Cited

U.S. PATENT DOCUMENTS 6,703,729 B2 * 3/2004 Weeber .................. H02K 55/04
                                                  310/52
7,808,135 B2 * 10/2010 Salamah .................. H02K 9/12
                                                  310/59

FOREIGN PATENT DOCUMENTS

KR   2009-0029658 A    3/2009
KR   10-1281238 B1     7/2013

* cited by examiner

SEALING STRUCTURE FOR PERIPHERAL AREA OF GENERATOR FAN

CROSS REFERENCE TO RELATED APPLICATION

This application claims priority from Korean Patent Application No. 10-2018-0077467, filed on Jul. 4, 2018, the entire disclosure of which is incorporated herein by reference in its entirety.

BACKGROUND

1. Field

Apparatuses and methods consistent with exemplary embodiments relate to a sealing structure for a peripheral area of a generator fan, and more particularly, to a sealing structure for a peripheral area of a fan of a generator, the sealing structure being capable of suppressing introduction of hot cooling gas flowing toward a cooler through a cooling gas duct into cold cooling gas passing through the cooler.

2. Description of the Related Art

A generator is a device that converts a mechanical energy into an electric energy by using electromagnetic induction. It uses the principle that an induction current is generated when a conductor rotates within a magnetic field. A high capacity generator (of about 350 MW or more) uses gas (e.g., hydrogen gas), water, or a combination thereof as a cooling medium and it is usually sealed to prevent intrusion of dust or moisture into the generator and leakage of hydrogen gas from the generator.

During the process of producing electricity, a generator inevitably creates a considerable amount of heat that must be dissipated away from the generator for operating integrity. In a generator, hydrogen gas serving as a cooling medium is circulated in a closed cycle by a fan attached to a rotor shaft. For a closed cycle circulation of hydrogen gas, a generator usually has a built-in cooler that is used to cool heated hydrogen gas. In addition, each end of a stator is provided with a shaft bearing and a shaft seal.

The stator consists of a support frame, a stator core, and stator windings. The stator core provides a low magnetic impedance path for magnetic fields from the rotor to the stator, and supports the stator windings.

The stator core consists of a punched hole, an inside space block (ISSB) and an outside space block (OSSB). The punched hole provides a low magnetic impedance path for magnetic fields, the ISSB provides a circulation path for hydrogen gas, and the OSSB transmits the clamping pressure of a flange and provides a circulation path for hydrogen gas. In other words, within the stator core, the circulation paths for hydrogen gas are provided by the ISSB and the OSSB.

The rotor also has an internal circulation path for hydrogen gas. The internal circulation path for hydrogen gas includes an axial path formed between the rotor and the rotor shaft and multiple radial paths connected to the axial path.

Within a sealed generator, a closed circulation flow path for hydrogen gas is formed such that hydrogen gas is first cooled by a cooler to produce cold hydrogen gas, the cold hydrogen gas is then supplied to a rotor and a stator to absorb heat, resulting in production of hot hydrogen gas, and the hot hydrogen gas is returned to the cooler to be cooled. In order to effectively return the hydrogen gas passing through the stator and the rotor to the cooler, a gas duct may be installed. The gas duct extends from an axial end of the rotor to an inlet of the cooler. Here, the force of causing the internal circulation of cooling gas (i.e., hydrogen gas) is created by the fan that is mounted on the rotor shaft so as to be driven by the rotor shaft.

Because the closed circulation flow path for hydrogen gas is provided in the limited space of the sealed generator, there is likely to be a region where the flow of cold hydrogen gas exiting the cooler closely passes by the flow of hot hydrogen gas which has absorbed heat generated in the generator. When gas isolation between the cold hydrogen gas flow and the hot hydrogen gas flow is insufficient, the hot hydrogen gas flow is likely to mix with the cold hydrogen gas flow. In this case, generator cooling performance is degraded. Therefore, a means for preventing this is required.

SUMMARY

Aspects of one or more exemplary embodiments provide a sealing structure for sealing a peripheral area of a fan of a generator to prevent a hot cooling gas flow from mixing with a cold cooling gas flow.

Additional aspects will be set forth in part in the description which follows and, in part, will become apparent from the description, or may be learned by practice of the exemplary embodiments.

According to an aspect of an exemplary embodiment, there is provided a sealing structure for sealing a peripheral area of a fan of a generator, the sealing structure including: a rotor; a fan assembly including a ring-shaped fan body coupled to an axial end of the rotor, multiple fan blades radially arranged along a circumferential surface of the fan body, and an annulus groove formed in an axial outer end surface of the fan body; a stator arranged to surround the rotor with an air gap between the stator and the rotor; a cooler positioned a predetermined distance apart from the stator; and an annulus cooling gas duct including an outlet connected with the cooler and an inlet configured to cover the axial outer end surface of the fan body and an axial end of the air gap between the stator and the rotor, wherein an inlet-side end of the cooling gas duct includes a first member and a second member that are coaxially arranged and are positioned close to the axial outer end surface of the fan body and the axial end of the air gap, respectively, and an inlet-side end of the first member is inserted into the groove with a clearance, and a sealing device is provided on the inlet-side end of the first member.

The sealing device may be provided on a radially inner-side surface of the inlet-side end of the first member.

Alternatively, the sealing device may be provided on both of a radially inner-side surface and a radially outer-side surface of the inlet-side end of the first member.

The sealing means may be a labyrinth seal having one or more circumferentially extending protrusions arranged in the axial direction of the rotor.

The sealing means may be a herringbone seal having multiple wedge-shaped protrusions with tips disposed at a front side in a rotation direction of the rotor, the wedge-shaped protrusions being arranged at intervals in the circumferential direction.

The wedge-shaped protrusions may be arranged such that the tips shift from a center line extending in a circumferential direction of the rotor to an outer side in the axial direction of the rotor.

Alternatively, the wedge-shaped protrusions may be arranged such that the tips shift alternately from the center line to an outer side and an inner side in terms of the axial direction.

A chamber having a width smaller than that of the groove may be formed to be recessed, in the axial direction of the rotor, from a bottom surface of the groove.

According to an aspect of another exemplary embodiment, there is provided a cooling structure for cooling an interior of a generator, the cooling structure including: a rotor; a fan assembly including a ring-shaped fan body coupled to an axial end of the rotor, multiple fan blades radially arranged along a circumferential surface of the fan body, and an annulus groove formed in an axial outer end surface of the fan body; a stator arranged to surround the rotor with an air gap between the rotor and the stator; a cooler positioned a predetermined distance apart from the stator; an annulus cooling gas duct including an outlet connected with the cooler and an inlet configured to cover the axial outer end surface of the fan body and an axial end of the air gap between the stator and the rotor; and a generator casing coupled to the rotor shaft to provide a sealed space therein to prevent the cooling gas from flowing out of the generator casing, wherein an inlet-side end of the cooling gas duct includes a first member and a second member that are coaxially arranged and positioned close to the axial outer end surface of the fan body and the axial end of the air gap, respectively, and an inlet-side end of the first member is inserted into the groove with a clearance and a sealing device is provided on the inlet-side end of the first member.

Hot cooling gas that is a flow of the cooling gas having absorbed heat generated by the generator flows around the inlet-side end of the cooling gas duct, a portion of cold cooling gas that is a flow of a portion of the cooling gas cooled by the cooler flows through a passage between an outer surface of the first member and an inner surface of the generator casing, and the sealing means may prevent cold cooling gas flowing along a radially inner surface of the first member from mixing with the hot cooling gas flowing into the cooling gas duct through the inlet.

As described above, according to one or more exemplary embodiments, the sealing structure for sealing a peripheral area of a fan of a generator may be a combination of a groove formed in the surface of a fan body and a sealing device. The sealing structure suppresses the hot cooling gas flow from mixing with the cold cooling gas flow that closely pass by the cooling gas duct near the fan. Therefore, it is possible to prevent the temperature of the cooling gas from undesirably rising. Thus, the sealing structure enables the designed cooling performance to be actually obtained.

One or more exemplary embodiments have an advantage of effectively suppressing the hot cooling gas flow from mixing with the cold cooling gas flow through the groove formed in the surface of the fan body, by uniquely designing the shape and arrangement of the protrusions of the sealing device and by using the chamber provided within the groove.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
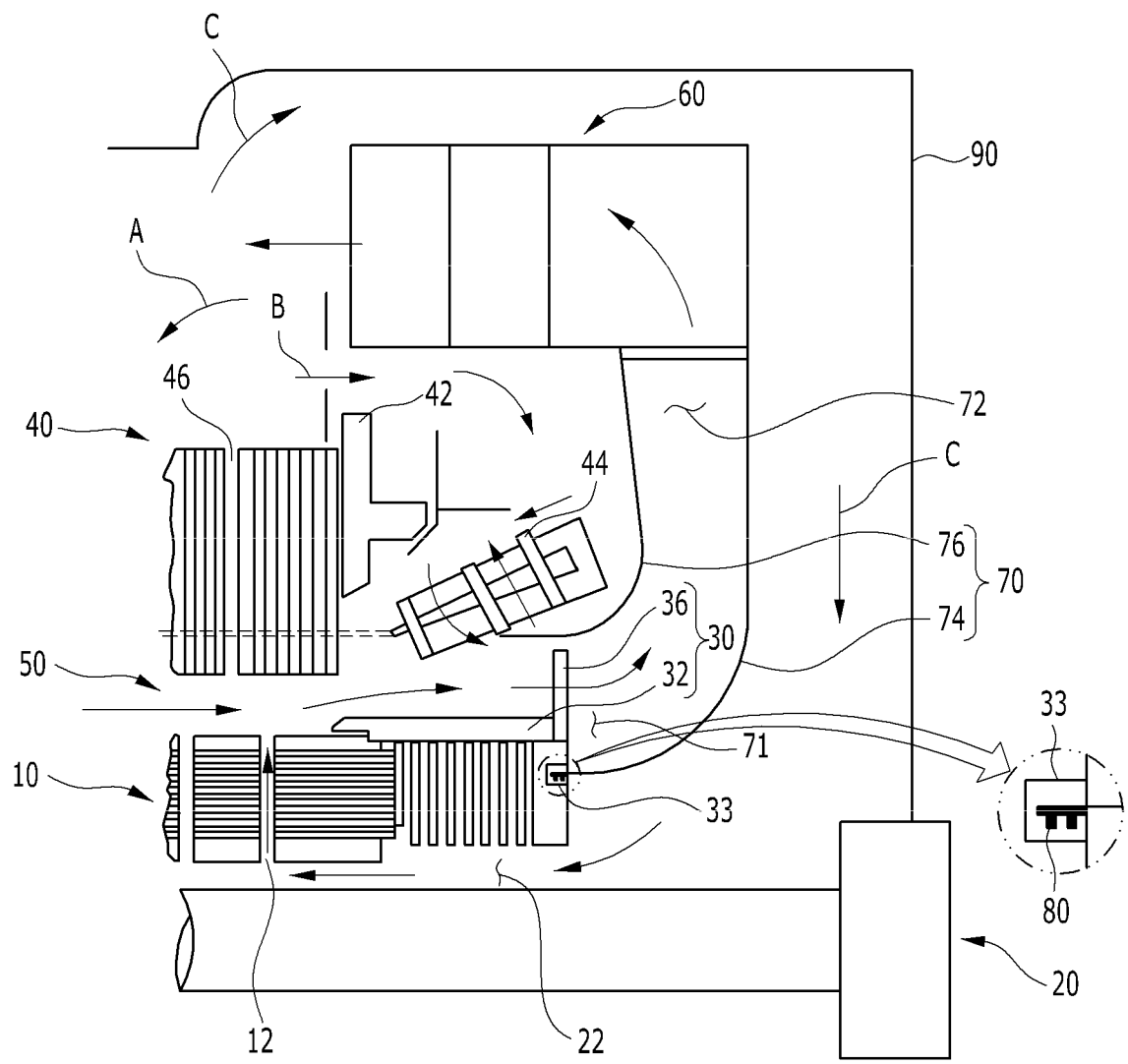
FIG. 1 is a view illustrating a sealing structure for sealing a peripheral area of a fan which is a part of an internal cooling structure of a generator according to an exemplary embodiment.

Various modifications may be made to the embodiments of the disclosure, and there may be various types of embodiments. Thus, specific embodiments will be illustrated in drawings, and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, terms such as "comprises", "includes", or "have/has" should be construed as designating that there are such features, regions, integers, steps, operations, elements, components, and/or a combination thereof in the specification, not to exclude the presence or possibility of adding one or more of other features, regions, integers, steps, operations, elements, components and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinbelow, embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a view illustrating a sealing structure for sealing a peripheral area of a fan that is a part of an internal cooling structure of a generator, according to an exemplary embodiment. Hereinafter, the overall construction of the sealing structure according to an exemplary embodiment will be described with reference to FIG. 1.

FIG. 1 illustrates a sealing structure positioned at a peripheral area of a fan of a generator and parts disposed around the fan. A fan assembly 30 is mounted on a rotor 10. The rotor 10 is mounted on a rotor shaft 20 in a manner to form an internal cooling channel 22 between the rotor 10 and the rotor shaft 20. The rotor 10 is rotated by the rotor shaft 20, and the fan assembly 30 that is mounted on the rotor 10 is also rotated by the rotor shaft 20. The fan assembly 30 includes a ring-shaped fan body 32 coupled to an axial end of the rotor 10 and multiple fan blades 36 arranged along an outer surface of the fan body 32 in a circumferential direction. When the fan blades 36 are rotated, a cooling gas (i.e., hydrogen gas) flow is generated within the generator.

The rotor 10 is surrounded by a stator 40 such that an outer surface of the rotor 10 is spaced from an inner surface of the stator 40. An induction current is induced by a magnetic field formed between the rotor 10 and the stator 40 that rotate in relative to each other. A suitable air gap 50 is provided between the rotor 10 and the stator 40. The air gap 50 serves as an internal cooling channel, prevents mechanical friction between the rotor 10 and the stator 40, and ensures electrical insulation between the rotor 10 and the stator 40.

The generator has an internal cooler 60 for dissipating the heat absorbed by the cooling gas. Hot cooling gas that is the cooling gas heated by absorbing the heat while passing through the generator enters the cooler 60 to release the heat. The hot cooling gas is cooled by the cooler 60, thereby becoming cold cooling gas. The cold cooling gas passes through the generator again to absorb the heat generated during the operation of the generator, and returns to the cooler 60 to release the heat. In this way, the cooling gas circulates within the generator.

In order to efficiently return the heated cooling gas to the cooler 60, it is necessary to install a duct structure at a region where the hot cooling gas gathers. Such a duct structure is called a cooling gas duct 70. The cooling gas duct 70 includes an inlet 71 and an outlet 72. The inlet 71 is formed to cover an axial outer end surface of the fan body 32 and an axial end of the air gap 50 formed between the stator 40 and the rotor 10. The outlet 72 is connected with the cooler 60. FIG. 1 illustrates the cross-section of only the upper half of the rotor shaft 20. Although not illustrated, the same cooling gas duct 70 as the structure illustrated in FIG. 1 may be symmetrically provided on the lower half side of the rotor shaft 20. That is, the cooling gas duct 70 has an overall double-walled pipe form (i.e., annulus form) with a center hole in which the rotor shaft 20 is disposed when viewed three-dimensionally.

At the inlet side of the cooling gas duct 70, the cooling gas duct 70 includes a first member 74 and a second member 76 that are coaxially arranged and are positioned close to the axial outer end surface of the fan body 32 and the axial outer end of the air gap 50, respectively.

The flow of the cooling gas illustrated in FIG. 1 will be described briefly first because it is necessary to understand the reason why the inlet 71 of the cooling gas duct 70 is formed to cover the axial outer end surface of the fan body 32 and the axial end of the air gap end 50 formed between the stator 40 and the rotor 10.

The hot cooling gas enters into the cooler 60 to be cooled. Thus, the cooling gas passing through the cooler 60 is cold cooling gas which forms three-direction cooling gas flows. A first cooling gas flow is a flow of cooling gas in a first direction A which is a circumferential direction along the outer circumferential surface of the stator 40, thereby cooling the outer circumferential surface of the stator 40. This circumferential flow changes in direction at multiple axial intermediate positions to radially flow through radial cooling channels 46 of the stator 40, thereby cooling the interior of the stator 40. After this circumferential cooling gas flow reaches one axial end of the stator 40, the cooling gas returns to the opposite end through the air gap 50 formed between the stator 40 and the rotor 10. This returning flow through the air gap 50 is referred to as an axial cooling gas flow. On the other hand, the radial cooling gas flows flowing through the radial cooling channels of the stator 40 merge into the axial cooling gas flow.

A second cooling gas flow is a flow of cooling gas in a second direction B. This second cooling gas flow is to cool a stator flange 42 and stator end windings 44. A strong flange pressure is applied to the axial end of the stator 40. Because the axial end of the stator 40 is provided with the flange 42 having a large thickness and is provided with densely wound windings 44, a large amount of heat is generated from the axial end of the stator 40. Therefore, it is necessary to supply cold cooling gas to the axial end of the stator 40. Because the cooling gas flow in the second direction B exhibits high cooling performance when being directed at the axial end of the stator 40, a baffle or guide plate for guiding the cooling gas to flow in the second direction B may be installed.

A third cooling gas flow is a flow of cooling gas in a third direction C which is an axial direction along the internal cooling channel 22 between the rotor shaft 20 and the rotor 10. This flow is to cool the rotor 10. The cooling gas to form this flow enters into the internal cooling channel 22 through an opening formed at the axial end of the rotor 10. The cooling gas flowing in the internal cooling channel 22 branches into radial flows at intermediate positions like in the case of the stator 40. That is, the cooling gas flows across the rotor 10 in a radial direction through radial cooling channels 12, thereby cooling the interior of the rotor 10. The cooling gas absorbs heat while flowing in the first direction A, second direction B, and third direction C, and the heat-absorbed cooling gas (i.e., hot cooling gas) flows back to the cooler side end of the stator 40 through the air gap 50 provided between the stator 40 and the rotor 10. The cooling gas that flows via the radial cooling channel 46 of the stator moves inward (i.e., toward the stator core) and the cooling gas that flows via the radial cooling channel 12 of the rotor flows outward (i.e., toward the rotor perimeter). The radial cooling passages 46 of the stator 40 and the radial cooling passages 12 of the rotor 10 are arranged to shift.

Because the hot cooling gas that is heated by passing through the generator returns to the cooler side end of the stator 40, the inlet 71 of the cooling gas duct 70 is positioned within the area of the air gap 50 between the stator 40 and the rotor 10.

As illustrated in FIG. 1, the flows (in the directions A and B) of the cooling gas for cooling the stator 40 and the flow (in the direction C) of the cooling gas for cooling the rotor 10 are divided by the first member 74 and the second member 76 of the cooling gas duct 70. That is, the cooling gas for cooling the stator 40 flows through a passage positioned outside the second member 76 and the cooling gas for cooling the rotor 10 flows through a passage positioned outside the first member 74. In order to blow the heated cooling gas (i.e., hot cooling gas) into the cooling gas duct 70 through the inlet 71, the fan blades 36 of the fan assembly 30 are positioned in proximity to or within the inlet 71 of the cooling gas duct 70. Accordingly, the first member 74 of the cooling structure needs to be disposed close to the outer end surface of the fan body 32 of the fan assembly 30.

However, with the structure of the cooling gas duct 70, the hot cooling gas routed to the fan blades 36 and the cold cooling gas (i.e., C-direction flow) routed to cool the rotor 10 flow in opposite directions but flow in proximity to each other with the first member 74 interposed therebetween. Therefore, there is a risk that two cooling gas flows, one of which is hot and the other of which is cold, mix at a region near the end of the first member 74. In further detail, the hot cooling gas has a higher pressure because it is pushed by the air force generated by the fan blades 36. Therefore, there is a possibility that the hot cooling gas is introduced into the cold cooling gas flow routed to cool the rotor 10. When a large amount of hot cooling gas is discharged from the end of the first member 74, which is disposed near the inlet 71 of the cooling gas duct 70, the temperature of the cooling gas for cooling the rotor 10 is raised before it cools the rotor 10. Therefore, the rotor cooling efficiency may be deteriorated.

In order to prevent this, the end of the first member 74, which is disposed on the inlet 71 of the cooling gas duct 70, is inserted into an annulus 33 formed in the outer end surface of the fan body 32 in a manner to have a clearance in a groove. In addition, the end of the first member 74 is provided with a sealing device that prevents the hot cooling gas from flowing out. The clearance (i.e., a proper physical spacing) between the end of the first member 74 and the inside surface of the annulus groove 33 is necessary to reduce mechanical stress which is likely to occur when the fan assembly 30 that is a moving part and the cooling gas duct 70 that is a stationary part are in direct contact with each other.

Because the end portion of the first member 74 is inserted into the annulus groove 33 in a manner to have a clearance, both of the radially inner-side surface and the radially outer-side surface of the end portion of the first member 74 are exposed to the cooling gas. Therefore, the sealing device 80 may be provided on both of the radially inner-side surface and the radially outer-side surface of the end portion of the first member 74. When the both of the radially inner-side surface and the radially outer-side surface of the end portion of the first member 74 are provided with the sealing device 80, the sealing effect is high. However, in some cases, only either one of the radially inner-side surface or the radially outer-side surface is provided with the sealing device 80 in terms of space constraints and ease of maintenance. In this case, considering the fact that the hot cooling gas, whose pressure is increased due to the operation of the fan blades 36, exerts a force of expanding the first member 74 of the cooling gas duct 70, it is preferable to install the sealing device 80 on the radially inner-side surface (i.e., the surface on the rotor side in the drawings) of the end portion of the first member 74. With this arrangement of the sealing device 80, there is no chance that the air gap 50 between the sealing device 80 and the surface of the groove 33 is increased but there is a high likelihood that the air gap 50 is narrowed due to the expansion of the first member 74. Therefore, this arrangement is advantageous in terms of controlling the outflow of the hot cooling gas.

Reference numeral 90 in FIG. 1 denotes a generator casing 90. The generator casing 90 is installed to seal its inside space in conjunction with the rotor shaft 20, thereby defining a sealed internal space to accommodate the stator 40, the cooler 60, the cooling gas duct 70, and the like while preventing the cooling gas from flowing out of the generator casing 90. At the region around the inlet 71 of the cooling gas duct 70, there are two cooling gas flows. One is the flow of the hot cooling gas that is heated by absorbing the heat generated from the generator and the other is the flow (i.e., third-direction flow C) of the cold cooling gas that is cooled by the cooler 60 and flows through a passage between the first member 74 of the cooling gas duct 70 and the generator casing 90. Therefore, the presence of the sealing device 80 is very advantageous in terms of suppressing the mixing between the cold cooling gas flowing along the inside surface of the first member 74 and the hot cooling gas flowing into the inlet 71 of the cooling gas duct 70.

Figure 2:
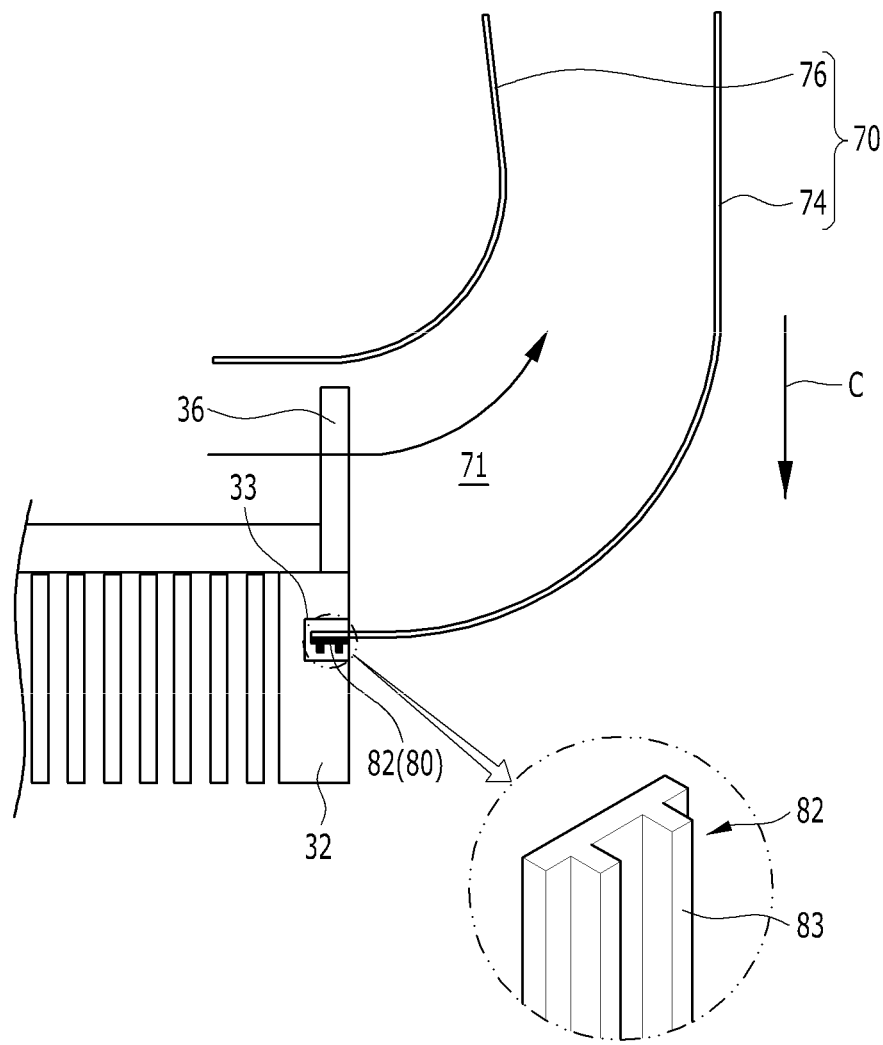
FIG. 2 is a view illustrating a labyrinth seal serving as a sealing device according to an exemplary embodiment.

FIG. 2 is a view illustrating one embodiment of the sealing device 80. The sealing device 80 in this embodiment may be a labyrinth seal 82 having at least one protrusion 83 extending along a circumferential direction. The labyrinth seal 82 is a seal provided in the air gap 50 between the rotor 10 and the stator 40. The protrusion 83 extending along the circumferential direction acts as a barrier against the flow of the cooling gas and forms a vortex flow which strongly resists against a fluid flow, thereby inhibiting the outflow of cooling gas. Here, the labyrinth seal 82 may be provided at the end of the first member 74, which is inserted into the groove 33, thereby preventing the hot cooling gas blown by the fan blades 36 from flowing back into the groove 33 and from mixing with the flow (C flow) of the cold cooling gas.

Hereinafter, it is illustrated that the sealing device 80 is provided on the radially inner-side surface of the inlet-side end portion of the first member 74, but it is understood that this is only an example and other exemplary embodiments are not limited thereto. The sealing device 80 can be provided on both of the radially inner-side surface and the radially outer-side surface of the inlet-side end portion of the first member 74.

Figure 3:
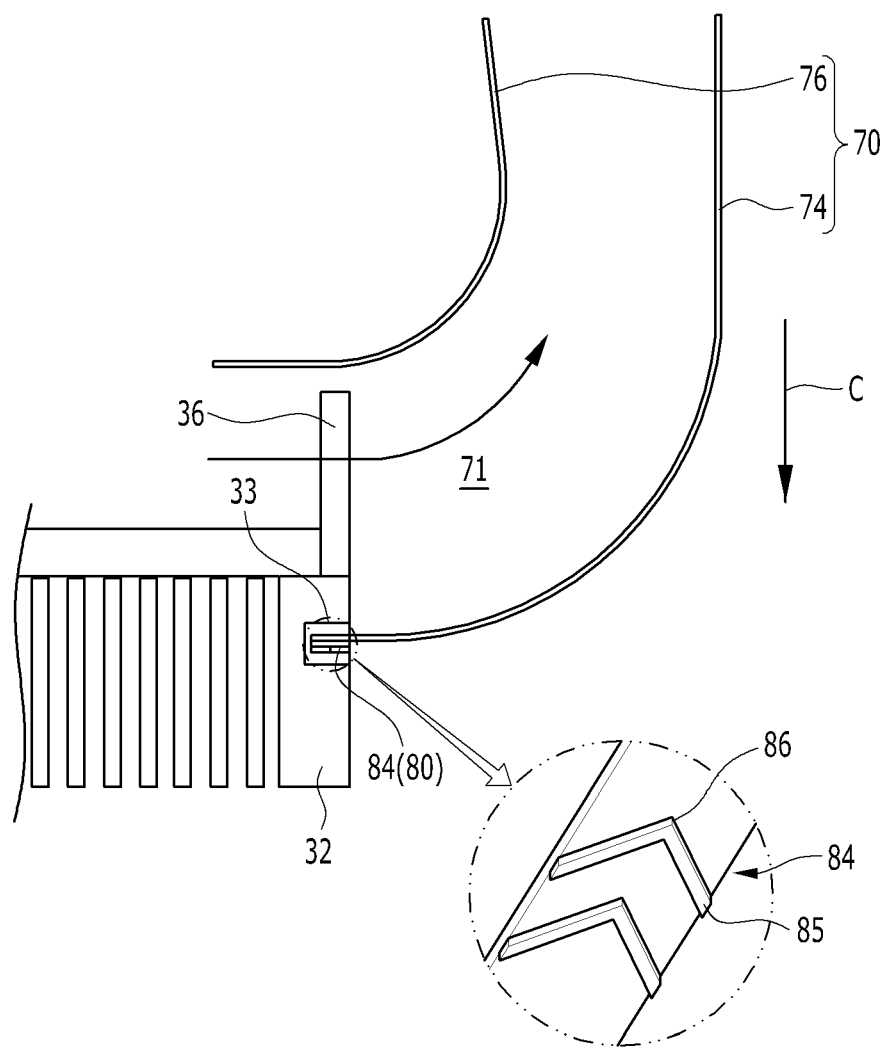
FIG. 3 is a view illustrating a herringbone seal serving as a sealing device according to another exemplary embodiment.

FIG. 3 is a view illustrating another embodiment of the sealing device 80. In this embodiment, the sealing device 80 may be a herringbone seal 84 formed such that wedge-shaped protrusions 85 with tips 86 positioned to face the direction of rotation of the rotor 10. The wedge-shaped protrusions 85 are arranged at intervals along the circumferential direction. The term "herringbone seal" is coined to describe the wedge-shaped protrusions (i.e., the shape of the bone of a herring). Because the seal 84 is a unique seal that was not found in the past, the name of the seal 84 is newly created as "herringbone seal".

The herringbone seal 84 features that it has wedge-shaped protrusions 85 and the tips 86 of the wedge-shaped protrusions 85 face the direction of rotation of the rotor 10. That is, the tips 86 of the wedge-shaped protrusions 85 are positioned at the front side and the ends of the leg portions of the wedge-shaped protrusions 85 are positioned at the rear side in terms of the direction of rotation of the rotor 10. When the rotor 10 is rotated at high speed (e.g., 3,600 RPM on 60-Hz AC), an air flow occurs within the narrow space of the groove 33. That is, the flow of air occurs within the clearance between the surface of the groove 33 and the surface of the sealing device 80 due to the cooling gas blown toward the rotor 10 by the fan blades 36. Because the tips 86 of the wedge-shaped protrusions 85 are positioned in the direction of rotation of the rotor 10, this air flow is split at the tip 86 of each wedge-shaped protrusion 85 into two flows flowing along the leg portions of the wedge-shaped protrusion 85. Due to the split of the air flow caused by each of the wedge-shaped protrusions 85, the air flows outward in the groove 33. The outward air flow in the groove 33 effectively suppresses the hot cooling gas from entering into the groove 33 and from merging into the cold cooling gas flow (i.e., C-direction flow).

Figure 4:
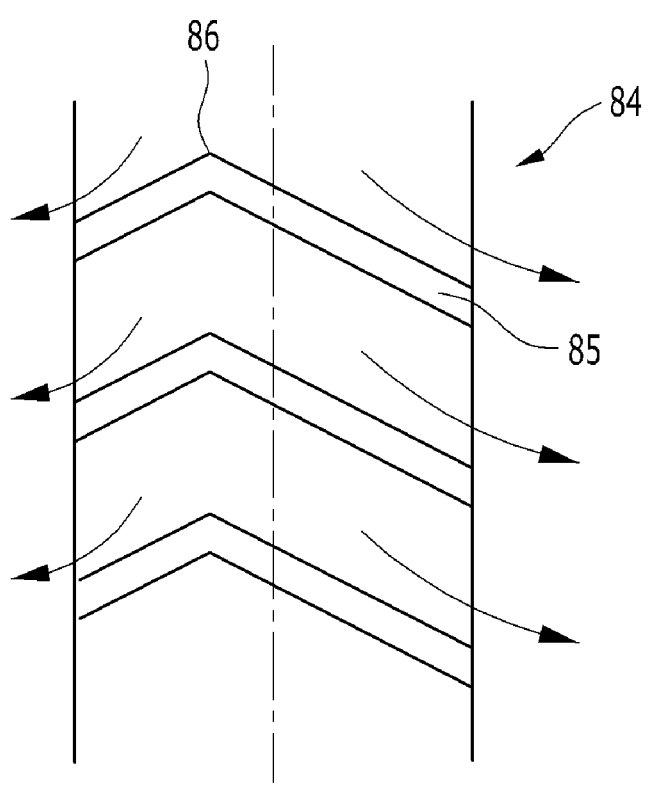
FIG. 4 is a view illustrating a herringbone seal serving as a sealing device according to another exemplary embodiment.

FIG. 4 is a view illustrating another embodiment of the sealing device 80. In this embodiment, the wedge-shaped protrusions 85 of a herringbone seal 84 are arranged in a different manner from that of FIG. 3. The herringbone seal 84 of FIG. 4 is formed such that the tips 86 of the wedge-shaped protrusions 85 are shifted to one side of the centerline (i.e., extending along the circumferential direction) of the herringbone seal 84 while the herringbone seal 84 of FIG. 3 is formed such that the tips 86 of the wedge-shaped protrusions 85 are all aligned at the centerline. In FIG. 4, the tips 86 of the wedge-shaped protrusions 85 are shifted to the axially outer side than the centerline. In other words, of the inclined leg portions of the wedge-shaped protrusion 85, which extend outward and inward, respectively, within the groove 33 from the tip 86 of the wedge-shaped protrusion 85, the outward inclined leg is longer than the inward inclined leg. In this case, the flow of the cooling gas moving outward from the groove 33 is faster than the flow of the cooling gas moving inward. Therefore, it is possible to effectively suppress the hot cooling gas from entering into and mixing with the cold cooling gas.

Figure 5:
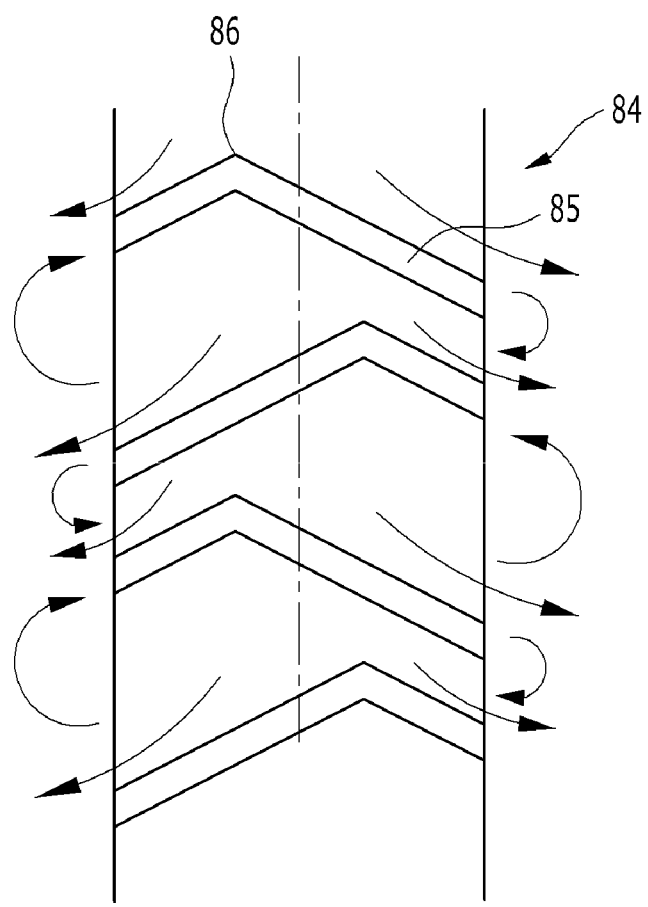
FIG. 5 is a view illustrating a herringbone seal serving as a sealing device according to another exemplary embodiment.

FIG. 5 is a view illustrating another embodiment of the sealing device 80. In this embodiment, the wedge-shaped protrusions 85 of a herringbone seal 84 are arranged in a different manner from that of FIG. 4. In FIG. 5, the tips 86 of the wedge-shaped protrusions 85 of the herringbone seal 84 are alternately shifted to the axially inner side and the axially outer side of the circumferentially extending centerline. This arrangement of the wedge-shaped protrusions 85 is intended to deliberately cause a difference in air flow between each of the adjacent wedge-shaped protrusions 85, thereby causing a vortex flow between each of the wedge-shaped protrusions 85. In other words, a vortex component is added to the air flow exiting the groove 33, thereby creating a complex entangled flow field in the vicinity of the entrance of the groove 33, thereby effectively preventing the introduction of the cooling gas into the groove 33.

Figure 6:
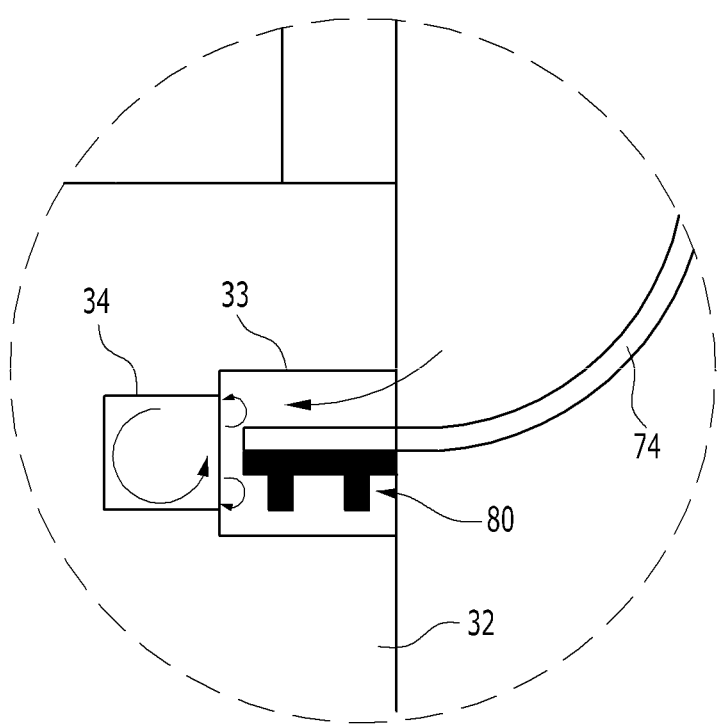
FIG. 6 is a view illustrating a small chamber formed at the bottom of a groove in which the sealing device according to one or more exemplary embodiments is provided.

FIG. 6 is a view illustrating a chamber formed at the bottom of the groove 33 in which the sealing device according to one or more exemplary embodiments is provided. Referring to FIG. 6, in the case of the herringbone seals 84 according to one or more exemplary embodiments of FIGS. 3 to 5, a chamber 34 having a narrower width than the groove 33 may be formed at the bottom surface of the groove 33. The chamber 34 is formed to be recessed from the bottom surface of the groove 33. The chamber 34 serves as a disturbing element that causes turbulence of the air flow that is flown into the groove 33. The turbulent flow occurring in the groove 33 obstructs the cooling gas in flowing into the groove 33, thereby preventing the hot cooling gas from mixing with the cold cooling gas.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A sealing structure for sealing a peripheral area of a fan of a generator, the sealing structure comprising:
  a rotor;
  a fan assembly including a ring-shaped fan body coupled to an axial end of the rotor, multiple fan blades radially arranged along a circumferential surface of the fan body, and an annulus groove recessed, in an axial direction of the rotor, from an axial outer end surface of the fan body;
  a stator arranged to surround the rotor with a predetermined air gap between the stator and the rotor;
  a cooler positioned a predetermined distance apart from the stator; and
  an annulus cooling gas duct including an outlet connected with the cooler and an inlet configured to cover the axial outer end surface of the fan body and an axial end of the air gap between the stator and the rotor,
  wherein an inlet-side end of the cooling gas duct includes a first member and a second member that are coaxially arranged and are positioned close to the axial outer end surface of the fan body and the axial end of the air gap, respectively, and an inlet-side end of the first member is inserted into the groove so as to have a predetermined clearance, and a sealing device is provided on the inlet-side end of the first member, and
  wherein the sealing device is provided on a radially inner-side surface of the inlet-side end of the first member.

2. The sealing structure according to claim 1, wherein the sealing device is provided on both of the radially inner-side surface and a radially outer-side surface of the inlet-side end of the first member.

3. The sealing structure according to claim 1, wherein the sealing device is a labyrinth seal having one or more circumferentially extending protrusions arranged in an axial direction of the rotor.

4. The sealing structure according to claim 1, wherein the sealing device is a herringbone seal having multiple wedge-shaped protrusions with tips arranged at a front side in a direction of rotation of the rotor, the wedge-shaped protrusions being arranged at intervals in a circumferential direction.

5. The sealing structure according to claim 4, wherein the tips of the wedge-shaped protrusions are arranged to shift to an axially outer side from a circumferentially extending centerline of the herringbone seal.

6. The sealing structure according to claim 5, wherein a chamber having a width smaller than that of the groove is recessed in the axial direction from a bottom surface of the groove.

7. The sealing structure according to claim 4, wherein the tips of the wedge-shaped protrusions are arranged to alternatively shift to an axially outer side and an axially inner side from a circumferentially extending centerline of the herringbone seal.

8. The sealing structure according to claim 7, wherein a chamber having a width smaller than that of the groove is recessed in the axial direction from a bottom surface of the groove.

9. The sealing structure according to claim 1, wherein a radial cooling channel of the stator through which the cooling gas flows inward and a radial cooling channel of the rotor through which the cooling gas flows outward are arranged to be shifted along the axial direction.

10. An internal cooling structure for a generator, the cooling structure comprising:
  a rotor;
  a rotor shaft to which the rotor is coupled so as to form an internal cooling channel between the rotor shaft and the rotor;
  a fan assembly including a ring-shaped fan body coupled to an axial end of the rotor, multiple fan blades radially arranged along a circumferential surface of the fan body, and an annulus groove recessed, in an axial direction of the rotor, from an axial outer end surface of the fan body;

a stator arranged to surround the rotor with a predetermined air gap between the stator and the rotor;

a cooler positioned a predetermined distance apart from the stator;

an annulus cooling gas duct including an outlet connected with the cooler and an inlet configured to cover the axial outer end surface of the fan body and an axial end of the air gap between the stator and the rotor, and a generator casing coupled to the rotor shaft to provide a sealed space therein to prevent the cooling gas from flowing out of the generator casing, wherein an inlet-side end of the cooling gas duct includes a first member and a second member that are coaxially arranged and are positioned close to the axial outer end surface of the fan body and the axial end of the air gap, respectively, and an inlet-side end of the first member is inserted into the groove so as to have a predetermined clearance, and a sealing device is provided on the inlet-side end of the first member, and wherein the sealing device is provided on a radially inner-side surface of the inlet-side end of the first member.

11. The cooling structure according to claim 10, wherein hot cooling gas that is a flow of the cooling gas having absorbed heat generated by the generator flows around the inlet-side end of the cooling gas duct, a portion of cold cooling gas that is a flow of a portion of the cooling gas passing through the cooler flows through a passage between an outer surface of the first member and an inner surface of the generator casing, and the sealing device prevents cold cooling gas flowing along a radially inner surface of the first member from mixing with the hot cooling gas entering into the cooling gas duct through the inlet of the cooling gas duct.

12. The cooling structure according to claim 10, wherein the sealing device is a labyrinth seal having one or more circumferentially extending protrusions arranged in the axial direction of the rotor.

13. The cooling structure according to claim 10, wherein the sealing device is a herringbone seal having multiple wedge-shaped protrusions with tips arranged on a front side in a direction of rotation of the rotor, the wedge-shaped protrusions being arranged at intervals in a circumferential direction.

14. The cooling structure according to claim 13, wherein the tips of the wedge-shaped protrusions are arranged to shift to an axially outer side from a circumferentially extending centerline of the herringbone seal.

15. The cooling structure according to claim 14, wherein a chamber having a width smaller than that of the groove is recessed in the axial direction from a bottom surface of the groove.

16. The cooling structure according to claim 13, wherein the tips of the wedge-shaped protrusions are arranged to alternatively shift to an axially outer side and an axially inner side from a circumferentially extending centerline of the herringbone seal.

17. The cooling structure according to claim 16, wherein a chamber having a width smaller than that of the groove is recessed in the axial direction from a bottom surface of the groove.

18. The sealing structure according to claim 10, wherein a radial cooling channel of the stator through which the cooling gas flows inward and a radial cooling channel of the rotor through which the cooling gas flows outward are arranged to be shifted along the axial direction.

* * * * *